United States Patent

[11] 3,565,385

| [72] | Inventor | Edward F. Zurawski<br>Chicago, Ill. |
|---|---|---|
| [21] | Appl. No. | 771,482 |
| [22] | Filed | Oct. 29, 1968 |
| [45] | Patented | Feb. 23, 1971 |
| [73] | Assignee | Garcy Corporation |

[54] FLUORESCENT TUBE BOX SUSPENSION SYSTEM AND MEANS
7 Claims, 7 Drawing Figs.

[52] U.S. Cl................................................. 248/343, 248/68
[51] Int. Cl..................................................... F16l 3/24
[50] Field of Search........................................... 248/317, 342, 343, 50, 68, 73; 240/78, 76, 72, 52.1

[56] References Cited
UNITED STATES PATENTS
| 2,898,076 | 8/1959 | Versen........................... | 248/343 |
|---|---|---|---|
| 3,132,831 | 5/1964 | Stamper........................ | 248/68 |
| 3,182,941 | 5/1965 | Seckerson..................... | 248/316 |
| 3,356,840 | 12/1967 | Cohen............................ | 248/343 |

FOREIGN PATENTS
| 110,762 | 5/1964 | Czechoslovakia............ | 248/68 |
|---|---|---|---|
| 348,737 | 10/1960 | Switzerland.................. | 248/68 |

Primary Examiner—Marion Parsons, Jr.
Attorney—Dressler, Goldsmith, Clement & Gordon ABSTRACT: A suspension system for a fluorescent tube box and the like including a slotted support member and a spring clip removably biased into keyed engagement with the support member. The spring clip embraces and straddles the box and has free ends which project into slots in the support member which ends are then spring biased within the support member to positions remote from the slots to key the clip ends and support member to prevent removal of the spring clip ends thereby to prevent removal of the spring clip and embraced box from the support member.

PATENTED FEB 23 1971 3,565,385
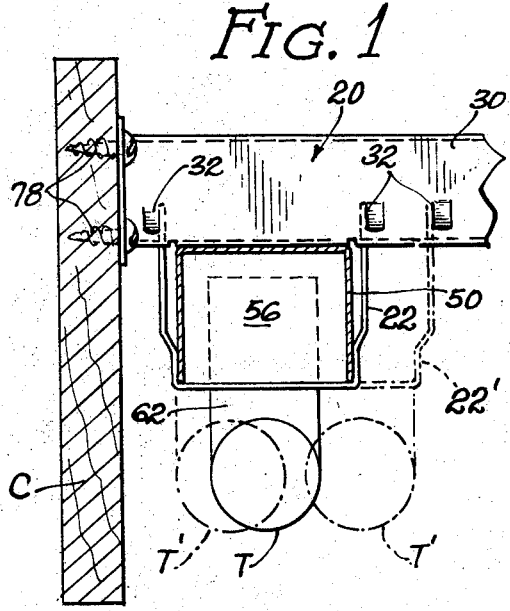
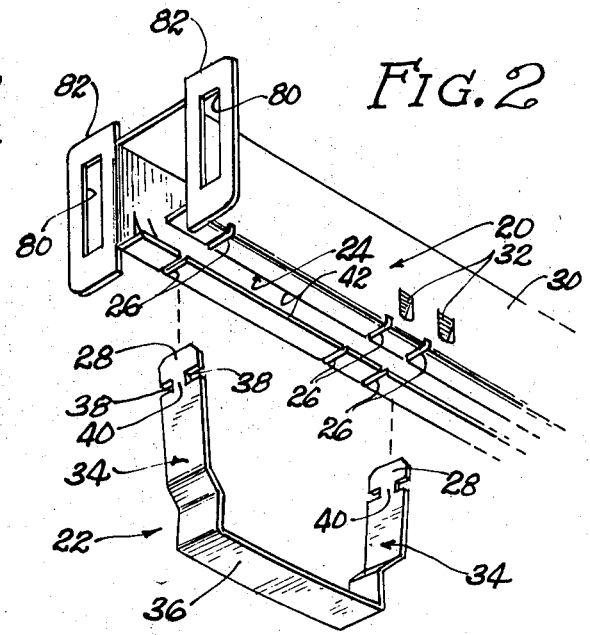
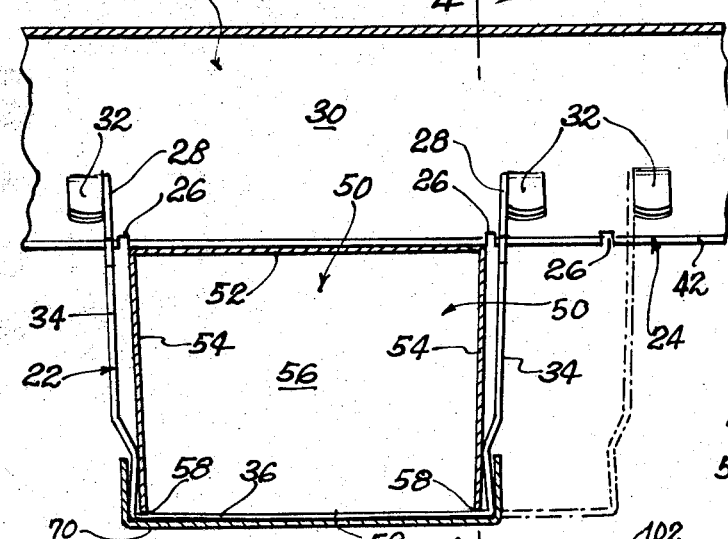
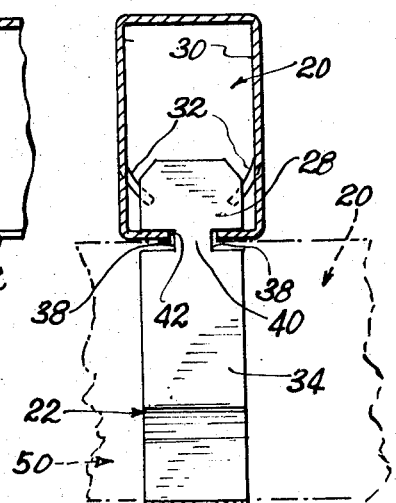
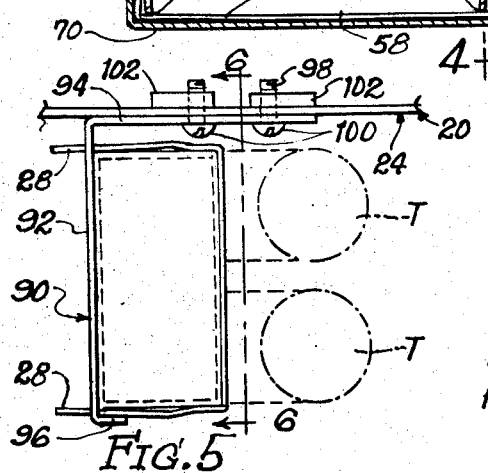
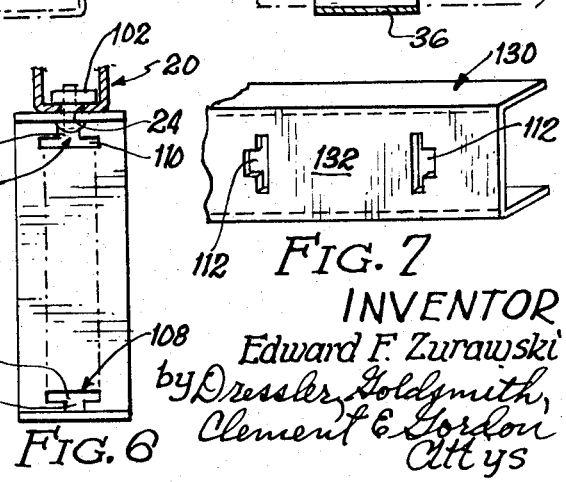
INVENTOR
Edward F. Zurawski
by Dressler, Goldsmith,
Clement & Gordon
Attys

FLUORESCENT TUBE BOX SUSPENSION SYSTEM AND MEANS

In the art of suspending fluorescent tube boxes, such as from ceilings, support brackets and the like, it has been conventional practice to secure the boxes to such by threaded means, such as screws, passing through the box and into engagement with the support surface or member. Such practices have been time consuming and cumbersome. Such practices also, from time to time, have provoked controversies among the several trades involved in construction work and in the wiring and installation of such boxes.

The invention of this application obviates those and other problems and difficulties by providing constructions which provide quick and simple means for suspending fluorescent tube boxes from support surfaces. These constructions separate the functions of securing a support member, such as a channel, to a support surface from the securance of the tube box to the support surface. Once the support member is appropriately positioned, the box is simply connected to the support member be a spring clip which embraces the box and keys to the support member without other connecting means such as screws, nuts and bolts and the like. Such a construction makes it possible, for example, for an electrician to wire a box at the floor level and to connect the box to the support surface himself and without the necessity of calling upon another building tradesman, such as a carpenter, to connect the box to the support surface, as by screws. No separate mechanical means are needed to so connect the box.

Thus the invention provides a suspension system including a support member and a clip, the clip comprising a central web and a pair of spaced-apart arms forming a section for embracing a fluorescent tube box transversely of its length, each of the arms terminating in a free end extending beyond the fluorescent tube box, the support member defining a pair of spaced-apart slots for receiving the free ends, the free ends and the support member defining means for keying the free ends to the support member, and means for urging the keying means into engagement whereby the clip is restrained from removal from the support member. More particularly, the support member and clip-keying means comprises further slot means in the support member adjacent the spaced-apart slots and the clip is a spring clip defining notch and web means cooperably positionable within the slot means and with respect to the support member whereby they are spring biased into keying engagement, thereby to suspend a fluorescent tube box from the support member.

Yet other objects, advantages and purposes of this invention will become apparent from the following description and appended drawings of which:

FIG. 1 is a fragmentary view of a support member embodying the support system of this invention;

FIG. 2 is an exploded perspective view of a portion of FIG. 1;

FIG. 3 is an enlarged sectional view of a portion of FIG. 1;

FIG. 4 is a sectional view of FIG. 3 taken substantially along line 4—4 of FIG. 3;

FIG. 5 illustrates another embodiment of this invention;

FIG. 6 is a partial sectional view taken substantially along line 6—6 of FIG. 5; and FIG. 7 illustrates a further support member adapted for use in accordance with this invention.

Referring first to FIGS. 1 to 4, a support member 20 is provided for suspension of a conventional elongate fluorescent tube box. Such boxes have previously been suspended from support members by direct mechanical securance thereto, as by nut and bolt means or screw means, the bolts or screws projecting through the top wall of the elongate box.

In accordance with this invention, an improved suspension system is provided. To that end, a support member 20 is slotted to receive a clip 22 for snap retention thereby. Thus, boxlike support member 20 is provided with a longitudinal slot 24 and transverse-segmented slots 26 spaced apart in a manner to be described. As seen, slots 26 than longitudinal slot 24. Transverse slots 26 are proportioned to them. the ends 28 of clip 22 in a sliding fit. Support member 20 also defines a plurality of stop means projecting inwardly of the sides 30 of the support member. In FIG. 2 those stop means are shown as projections 32 which are punched inwardly of sides 30 of the support member. Projections 32 are spaced from slots 26, the distance between cooperating projections being greater than the distance between cooperating slots 26 as best seen in use in FIG. 3.

Clip 22 is preferably of a springlike material which when ends 28 are urged toward each other, tend to return ends 28 to their initial positions. As seen in FIGS. 2 and 3, the normal relative position of ends 28 is such that they are spaced apart a distance greater intersect the pair of transverse slots 26 provided to accommodate receive Clip 22 is generally U-shaped in configuration with the arms 34 of the U at an angle of slightly greater than 90° to the base 36. At the ends 28 of each of the arms 34, notch or slot means comprising a pair of opposed notches 38 spaced apart by a web 40 are provided. Web 40 is of a transverse dimension no greater than the width of slot 24 and notches 38 are proportioned to receive the edges 42 of member 20 which define slot 24.

As will be understood, clip 22 is securable to member 20 by urging ends 28 toward each other until they are spaced apart a distance to enable both ends to enter a pair of complementary spaced apart transverse slots 26. After the ends have been moved inwardly to a point where web 40 is adjacent the edges 42 of member 20 defining slot 24 and notches 38 bridge the edges 42 of member 20, ends 28 are permitted to spring apart until their movement away from each other is arrested by projections 32.

As stated, the purpose of clips 22 is to suspend a box such as a fluorescent tube box from a support member. A plurality of such clips and complementary support members are intended to be used to support such boxes which usually run from 3 to 12 feet in length and sometimes longer.

Each such box 50 normally comprises a central web 52 with depending sidewalls 54 and depending end walls 56, the base of the end walls and of the sidewalls generally terminating in a common lower peripheral edge as designated at 58 in FIG. 3. Each such box is adapted to be wired as necessary and to mount end sockets, as indicated at 62 in FIG. 1, a pair of which spaced-apart end sockets mount a fluorescent tube T.

Especially where long rows of boxes and tubes are intended to be used, it is usually the case that the boxes are secured to support members as by threaded members such as screws, a laborious and time-consuming procedure and one which, when the wiring is done below and the box is then elevated as to a ceiling, oftimes results in costly jurisdictional disputes between the different trades involved.

In accordance with this invention the boxes need not be fastened to supports by threaded means. This not only simplifies and reduces the expense of positioning the boxes, but also minimizes possible controversies between the carpentry and electrical trades.

Thus as stated above, when the spring clip is to be secured to the support, it is simply positioned to embrace the box transversely of its length with the clip arms straddling the box and the base edge 58 lying therebetween. Then ends 28 are brought together until they are spaced to allow them to pass into cooperating transverse slots 26. The spring force then biases the ends into interlocking engagement with the support member. Outward movement of the arms continues until projections 32 arrests the outward movement of the arms. The cooperating projections 32 are preferably spaced apart a distance less than the unsprung spacing of arms 28. That minimizes the possibility of sliding of the clip, hence inadvertent escape of the arms from their keyed engagement with the support.

After the necessary wiring and end sockets are installed it is normal practice to mount cover plates over the open bases of the boxes. Such covers are generally channel members of U-shape transverse section with notches to accommodate the sockets mounting the tube. Such covers are well known and conventional in the art.

Such covers are adaptable without modification for use in accordance with this invention. As best seen in FIG. 3, the transverse sections of the walls of box 50 and clip 22 are relatively narrow as compared to the overall widths of the box and clip. Indeed, in the vicinity of the clip, the sidewalls of the box are biased slightly inwardly by the clip arms to the end that the clip adjacent the base of the box projects minimally beyond the usual width of the box. Therefore the cover 70 and the arms thereof may be press fit over the clip arms with no greater difficulty than that normally encountered when the cover 70 is press fit over the sidewalls of the box. Thus the cover 70 frictionally engages clips 22, and the sidewalls of the box between spaced-apart adjacent clips.

As illustrated in FIGS. 1 to 4, the support member 20 there shown is provided with three transverse slots 26. The pair shown in use are spaced apart to accommodate a clip adapted to mount a conventional one tube box. The clip 22' (FIG. 1) is adapted to cooperate with the most widely spaced pairs of transverse slots (and cooperating projections 32) to the end that a conventionally sized two tube box for two tubes T' may be suspended in the same fashion described respecting box 50.

The support member 20 illustrated in FIGS. 1 to 4 is of a well-known cantilever type in which a pair of telescoping members are provided with a hook at one end for horizontal support from a slotted wall-mounted standard and the other or the free end illustrated in FIG. 2 is adapted to be connected to an elongate horizontally extending vertically oriented cornice C via threaded members 78 projecting through slots 80 in ears 82 at the end of one of the telescoping members.

The embodiment of FIGS. 1 to 4 is peculiarly adapted for horizontal support of fluorescent lighting fixtures and wherein the tubes are intended primarily to light the area therebelow. The invention, of course, is not so limited, since it is clear that the box used and the disposition of the support member may be such that the tubes project laterally of the support or even vertically upwardly of the support.

A further embodiment illustrated in FIGS. 5 and 6 is designed to be used with the support member 20 of FIGS. 1 to 4 but to position the box on a side edge so that the tubes are positioned to illuminate the area in the direction of the support member 20.

A further embodiment illustrated in FIGS. 5 and 6 is designed to be used with the support member 20 of FIGS. 1 to 4 but to position the box on a side edge so that the tubes are positioned to illuminate the area in the direction of the support member 20.

To that end an adapter 90 is secured to member 20. Adapter 90 is a U-shaped channel member having a vertical web 92, an elongate connector arm 94 and a short support arm 96, each of which arms may be integral with web 92 and project normally therefrom. Connector arm 94 is provided with apertures through which the threaded shanks 98 of bolts 100 pass. The heads of bolts 100 are greater in diameter than the apertures so that they will not pass through the apertures. Shanks 98 threadingly mate with key nuts 102 which are broader in at least one dimension than slot 24. When the long dimension thereof crosses slot 24 it will be apparent that adapter 90 may be drawn tightly against the support member to clamp the support member 20 between nuts 102 and arm 94.

Once adapter 90 is so secured, it is ready for mounting a fluorescent tube box via clip 22. As best scene in FIG. 6, the web 92 of adapter 90 is provided with a pair of spaced-apart clip receiving and engaging means. In this embodiment these means are illustrated as a pair of T-shaped openings 108, the slots or vertical legs 112 of the opposed T-shaped openings extending in opposite directions.

To mount a clip 22 thereto, the ends 28 thereof are brought to a position in that they will pass into the cross arm portion 110 of the T-shaped openings. The width of each arm portion 110 is sufficient to receive the clip ends and thus is at least as wide as the widest portion of the clip ends. The vertical T-leg 112 of each T-shaped opening is of a width, as viewed in FIG. 6, to receive web 40 of clip 22. As such, when the biasing pressure against the legs of clip 22 is relieved, webs 40 enter the legs 112 of the opposed T-shaped openings and the clip is not then removable laterally of adapter 90 until the ends of the clip are again forced towards each other. The closed ends of legs 112 engage the webs 40 to prevent further outward movement generally in the manner of projections 32. The mounting of the clip to adapter 90 with a box, of course is identical to that described previously with respect to the embodiment of FIGS. 1 to 4.

Yet another embodiment is illustrated in FIG. 7. This embodiment, unlike those of FIGS. 1 to 6, is simply a channel support member 130 which need not be associated with a cantilever support member of the type so far illustrated. It illustrates the broader application of the system of this invention to a wide variety of environments.

In FIG. 7, channel member 130 is adapted for securance to a ceiling, to walls or to other surfaces from which it is desirable to suspend fluorescent tube boxes. Thus, for example, long sections of channel members 130 may be secured to a ceiling or ceiling furring as by threaded fasteners. Since a web 132 of the channel member is provided with clip receiving and retaining slots like those described in connection with FIGS. 5 and 6, it will be clear that boxes may be suspended from channel 130 in a similar fashion. It is of course apparent here that the leg of the T opening, as in the case of the embodiment of FIGS. 5 and 6, serves to receive web 40 of clip 22 and the portions of the ends 28 adjacent notches 38 serve to engage the inner surface of the channel web transverse of the leg opening to prevent withdrawal of the clip once clip ends 28 are sprung outwardly into the leg openings.

The suspension system of this invention is adapted for use in a wide variety of environments. In each instance the clip 22 is keyed to a support member to support a tube box thereon, the box being positioned to be immovable in a direction normal to its length until the clip ends are sprung out of cooperating openings in the support member. The box may be slid axially, where necessary to align it with other boxes, a further advantage not present in prior art constructions where threaded fasteners are used to anchor the box in a fixed position. The system is so designed that the usual cover plates may be used without modification to cover the open end of the box after wiring. It is also apparent that the clip and cooperating notches may be proportioned to be keyed by spring arms that are biased inwardly rather than outwardly, for example by more widely spacing such as the T-shaped openings of FIG. 6 and by oppositely directing legs of the T opening. This would also serve to lock the clip and support together.

Yet other variations and modifications will become apparent to those skilled in the art from a study of the specification, drawings and claims hereof, all of which variations and modifications are within the spirit and contemplation of this invention.

I claim:

1. In a system suspending a fluorescent tube box, a support member, a spring clip, a fluorescent tube box suspended by said spring clip from said support member, said spring clip comprising a central web and a pair of arms embracing said box transverse of its length, each of said arms terminating in a free and extending beyond said box and into engagement with said support member, a pair of cooperating slots defined by said support member for receiving said free ends, said free ends and said support member adjacent said slots defining means for keying said ends and support member to each other, said spring clip biasing said free ends into said keying engagement to prevent removal of said spring clip from said support member.

2. In the system of claim 1 in which said keying means further comprises means adjacent said cooperating slots for limiting movement of said free ends with respect to said support member.

3. In the system of claim 1 in which there is provided a box cover embracing and covering an open side of said box and a portion of said spring clip including said central web.

3. In a support system for fluorescent tube boxes and the like, a support member, a spring clip, said spring clip comprising a web terminating in spaced-apart arms, said web and said arms forming a section for embracing a fluorescent tube box transversely of its length, each of said arms terminating in a free end spaced beyond an embraced fluorescent tube box, said support member having a bottom wall means defining a pair of cooperating slots for receiving said free ends, said free ends and said support member defining means for interlocking said free ends and said support member when said free ends are received in said slots, and means for urging said interlocking means into interlocking engagement whereby said clip member is restrained from removal from said support member, said urging means comprising spring force for biasing said free ends into said interlocking engagement, said slots being transverse to the length of said support member, and said interlocking means comprising longitudinal slot means in said bottom wall lengthwise of said support member and intersecting said slots and notch means in said free ends for slidable reception of said support member adjacent said longitudinal slot means, said support member further having sidewalls, said interlocking means further comprising stop means on said sidewalls for engagement with said free ends to limit movement of said free ends within said support member.

5. In a support system for fluorescent tube boxes and the like, a support member, a spring clip, said spring clip comprising a web terminating in spaced apart arms, said web and said arms forming a section for embracing a fluorescent tube box transversely of its length, each of said arms terminating in a free end spaced beyond an embraced fluorescent tube box, said support member defining a pair of cooperating slots for receiving said free ends, said free ends and said support member defining means for interlocking said free ends and said support member when said free ends are received in said slots, and means for urging said interlocking means into interlocking engagement whereby said clip member is restrained from removal from said support member, said urging means comprising spring force for biasing said free ends into interlocking engagement, said interlocking means comprising notch means defined by said free ends, and slot means defined by said support member intersecting said slots, said support member slot means receiving said free end and said free end notch means receiving said support member to interlock said free ends and said support member, said support member comprising an elongate support and an adapter removably secured thereto, said adapter defining said slots and said slot means.

6. In the support system of claim 5 in which said slot means defined by said support member comprises a T-leg intersecting each of said cooperating slots, with the T-legs extending oppositely from each other, and the interlocking means defined by said free ends further comprise web means flanked by said notch means on said free ends.

7. In a support system for fluorescent tube boxes and the like, a support member, a spring clip member, said spring clip member comprising a web terminating in spaced apart arms, said web and said arms forming a section for embracing a fluorescent tube box transversely of its length, each of said arms terminating in a free end spaced beyond an embraced fluorescent tube box, said support member defining a pair of cooperating slots for receiving said free ends, free ends and said support member defining means for interlocking said free ends and said support member when said free ends are received in said slots, and means for urging said interlocking means into interlocking engagement whereby said clip member is restrained from removal from said support member, said urging means comprising spring force for biasing said free ends into interlocking engagement, said spring clip member being generally U-shaped and said arms being positioned to be urged inwardly against said spring force, said pair of slots being spaced apart a distance less than the rest position of the free ends whereby the ends are urged toward each other to condition them for entry into said pair of slots, and whereby when the force urging said ends toward each other is relieved the ends spring into interlocking engagement with said support, said interlocking means further comprising stop means on said support for said arm ends, said stop means being more widely spaced than said slots to restrain unrestricted movement of said arm ends on said support.

PO-1050
(5/69)

UNITED STATES PATENT OFFICE
CERTIFICATE OF CORRECTION

Patent No. __3,565,385__   Dated __February 23, 1971__

Inventor(x) __Edward F. Zurawski__

It is certified that error appears in the above-identified patent and that said Letters Patent are hereby corrected as shown below:

Col. 1, line 74, delete "than" and insert --intersect--. line 75, delete "them." and insert --receive--. Col. 2, line 14, delete "intersect" and insert --than--; line 15, delete "receive" and insert --them.--. Col. 3, line 66, "scene" should be --seen--. Col. 4, line 64, "and" should be --end. Col. 5, line 4, claim 4 is numbered as a second claim 3.

Signed and sealed this 29th day of June 1971.

(SEAL)
Attest:

EDWARD M. FLETCHER, JR.
Attesting Officer

WILLIAM E. SCHUYLER, JR.
Commissioner of Patents